(12) United States Patent
Nishihara

(10) Patent No.: US 8,643,755 B2
(45) Date of Patent: Feb. 4, 2014

(54) SOLID-STATE IMAGING DEVICE AND CAMERA SYSTEM

(75) Inventor: Toshiyuki Nishihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 541 days.

(21) Appl. No.: 12/929,837

(22) Filed: Feb. 18, 2011

(65) Prior Publication Data

US 2011/0242385 A1    Oct. 6, 2011

(30) Foreign Application Priority Data

Mar. 30, 2010   (JP) ................ 2010-077929

(51) Int. Cl.
*H04N 3/14* (2006.01)
*H01L 27/00* (2006.01)

(52) U.S. Cl.
USPC ........................ 348/308; 250/208.1

(58) Field of Classification Search
USPC ....................... 348/308; 250/208.1
See application file for complete search history.

(56) References Cited

U.S. PATENT DOCUMENTS 5,321,403 A * 6/1994 Eng et al. ............. 341/168
2008/0218619 A1 9/2008 Egawa

FOREIGN PATENT DOCUMENTS

JP   2008-124842   5/2008
JP   2008-136042   6/2008

* cited by examiner

*Primary Examiner* — Joel Fosselman
(74) *Attorney, Agent, or Firm* — Rader, Fishman & Grauer, PLLC

(57) ABSTRACT

A solid-state imaging device includes: a pixel circuit including a photoelectric conversion device and an amp device that outputs electric charges, which are photoelectrically converted by the photoelectric conversion device, through electric potential modulation of an output signal line; and a reading section including an AD (analog digital) conversion circuit that compares an output level of the signal line with a reference signal which changes with a regular slope and digitalizes an output signal on the basis of a timing at which a previously-defined relationship is satisfied between the output signal and the reference signal.

8 Claims, 11 Drawing Sheets

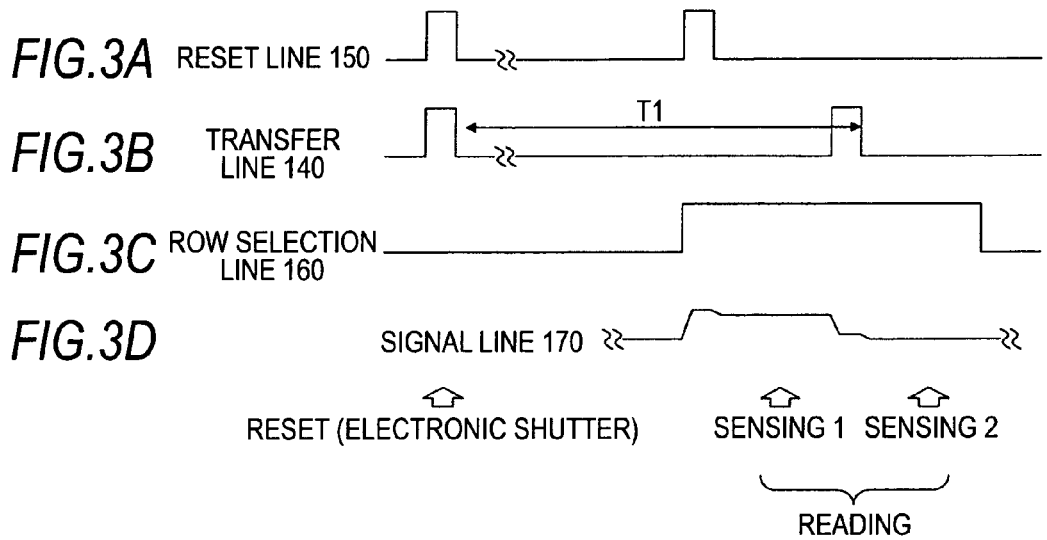
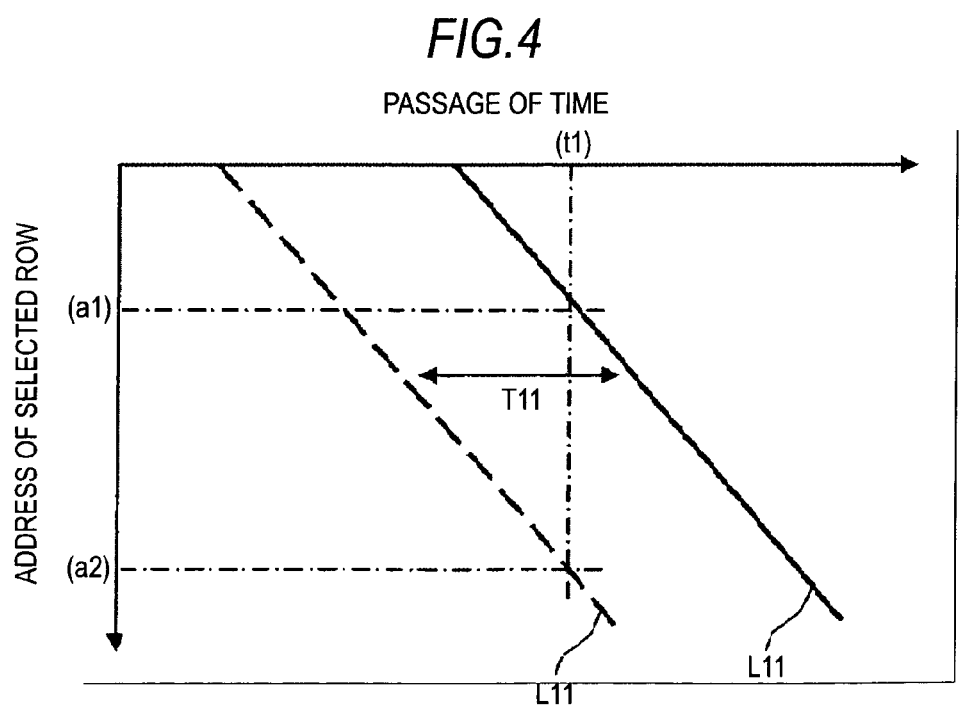

BRIEF OVERVIEW OF AD CONVERSION CIRCUIT

FIG. 6
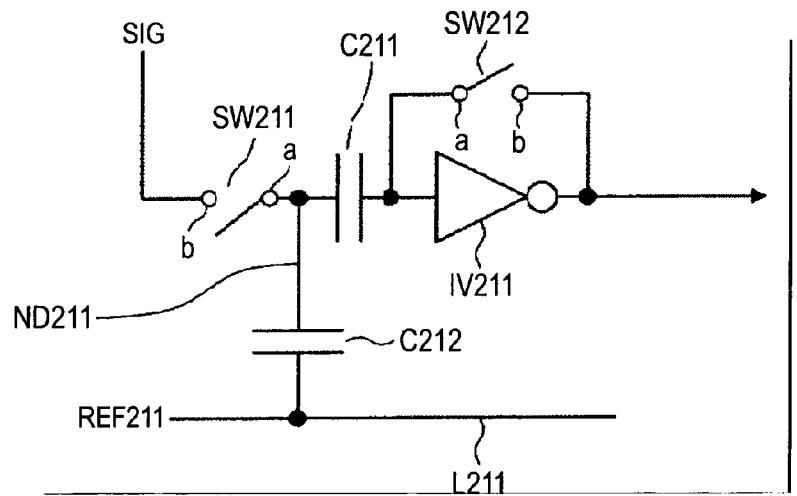
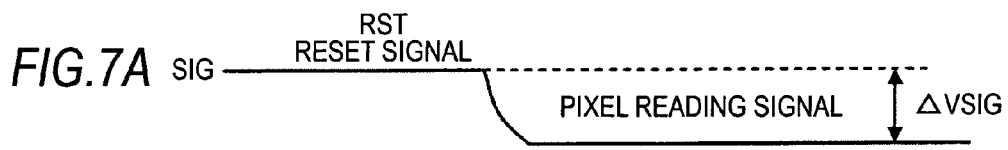
FIG. 7A SIG
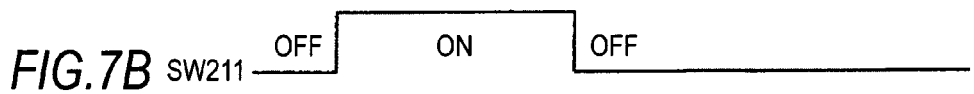
FIG. 7B SW211
FIG. 7C SW212
FIG. 7D REF211

SOLID-STATE IMAGING DEVICE AND CAMERA SYSTEM

BACKGROUND OF THE INVENTION

1. Field of the Invention

The present invention relates to a solid-state imaging device including a CMOS image sensor as a representative example and a camera system.

2. Description of the Related Art

Recently, CMOS imagers have been widely used in digital still cameras, camcorders, surveillance cameras, and the like, and the market thereof has also expanded.

A CMOS imager is configured to convert light, which is incident to each pixel, into electrons by using a photodiode as a photoelectric conversion device, accumulate them for a predetermined period of time, then digitalize a signal corresponding to the amount of accumulated charges, and output the signal to the outside.

Generally, each pixel circuit of the CMOS imager converts the electric charge signal, which is sent from the photodiode, into an electric potential signal of the vertical signal line through the source follower, which is built in the pixel circuit, so as to output the signal.

The selection for each pixel at the time of the reading is sequentially executed on a row-by-row basis, and the pixel signal of each column at the selected row is subjected to analog digital (AD) conversion in series or in parallel, and is output as the imaging data.

Particularly, in recent years, there has been an increase in the number of cases of having an AD converter for each column and concurrently performing conversion in order to achieve an increase in speed. An example of the related art is disclosed in JP-A-2008-136042.

As described above, in the AD conversion performed for each column at the same time, generally, the following method has been used.

Specifically, the output of the signal line for each column is determined by concurrently comparing with a common reference signal, which changes with a regular slope, through a comparison/determination unit which is provided for each column.

On the basis of the timing at which a previously-defined relationship is satisfied between the output signal and the reference signal, each output signal is converted into digital data.

For example, in the digitalization, a counter circuit for counting up a stored value in synchronization with the displacement of the reference potential is used. Thus, when the previously-defined relationship is satisfied between the reference potential and the signal potential, the counter value is latched for each column, and is employed as a digitalized signal. Another example of the related art is disclosed in JP-T-2008-124842.

SUMMARY OF THE INVENTION

In the above-mentioned AD conversion method, the resolution of the conversion further improves as the slope of the displacement of the reference signal is made to be gentler.

That is, the quantization error is reduced by decreasing the displacement range per one count, and thus particularly in a low illumination, it is possible to capture a higher quality image.

In such a case, when the count number is set to be constant, the maximum amount of displacement in the reference signal also decreases. Thus, the captured image part with a high illumination tends to be saturated. That is, the dynamic range of image capturing decreases.

When the count number is simply increased, the time necessary for the AD conversion increases to that extent, and thus it leads to a decrease in frame rate.

In order to cope with such a problem, JP-T-2008-124842 proposes an AD conversion method using two kinds of slope in the reference potential.

The AD conversion is performed twice by using a gentle slope and a steep slope. For example, the conversion result based on the gentle slope is used in the imaging data of the part with a low illumination, and the conversion result based on the steep slope is used in the imaging data of the part with a high illumination.

As a result, the AD conversion can be performed on the lower illumination part at a high resolution by using the gentle slope, and the grayscale data can be acquired from the high illumination part by using the steep slope. Thus, it is possible to satisfy both demands of the dynamic range and the accuracy of image capturing.

However, the method has the following problems.

Generally, in the parallel AD conversion processing of concurrently comparing the common reference signal with all the pixel signals of the multiple columns, the characteristic variations of plural comparison/determination units cause longitudinal streaks.

This is mostly caused by the offset variation of the comparing circuit. However, in a case where the reference potential changes at a higher speed, it is difficult to supply the identical reference signal to all the columns. Thus, a variation in the reference level occurs in accordance with the delay of the reference signal for each column.

Further, due to the skew of the counter clock or the inversion delay of the determination output from the comparing circuit, the timing of the latch for specifying the conversion value varies for each column. Therefore, on the basis of combination of both sides, the frequency of occurrence of longitudinal streaks complexly depends on the slope of the displacement of the reference potential.

That is, if the displacement slope of the reference signal is different, different longitudinal streaks occur in accordance therewith.

For example, in a case of performing AD conversion into a completely dark signal (zero data), the deviation amount of the count value caused by the offset of the comparing circuit is substantially inversely proportional to the slope. Thus, after gain adjustment, the longitudinal streaks become substantially constant, independent of the slope.

On the other hand, the deviation amount of the count value caused by the inversion delay of the determination output barely depends on the slope. In addition, when its gain is adjusted, the longitudinal streaks become larger as the slope is steeper.

In such a situation, when the selection of the AD conversion result is changed for each pixel in the imaging device by using two kinds of slope, longitudinal streaks occurring as a result change depending on a subject, and thus become completely irregular. In such a configuration, it is difficult to correct this in the subsequent processing.

In order to avoid such a problem, all signal lines for the AD conversion should be on standby for the settling thereof for each count. However, in this case, the conversion processing time excessively increases.

Moreover, in JP-T-2008-124842, there is another problem in that an amount of horizontal transfer twice that of the normal situation is necessary in order to concurrently perform the horizontal transfer of the results of the AD conversion performed twice.

Since the horizontal transfer is the main factor that limits the frame rate, it is difficult to avoid halving the frame rate.

In view of the above circumstances, it is desirable to provide a solid-state imaging device and a camera system capable of performing the AD conversion at a high resolution and at a high speed, obtaining the high quality imaging data in which the longitudinal streaks are appropriately canceled, and suppressing a decrease in the frame rate by preventing the amount of horizontal transfer from increasing.

According to one embodiment of the invention, there is provided a solid-state imaging device including: a pixel circuit including a photoelectric conversion device and an amp device that outputs electric charges, which are photoelectrically converted by the photoelectric conversion device, through electric potential modulation of an output signal line; and a reading section including an AD (analog digital) conversion circuit that compares an output level of the signal line with a reference signal which changes with a regular slope and digitalizes an output signal on the basis of a timing at which a previously-defined relationship is satisfied between the output signal and the reference signal. The reading section has a function of respectively performing first AD conversion, which is based on a first slope, and second AD conversion, which is based on a second slope, as AD conversion of imaging signals of pixels, and a function of further performing third AD conversion, which is based on the first slope, and fourth AD conversion, which is based on the second slope, as AD conversion of zero signals. The reading section selects, for each pixel, any one of pieces of digital data, which is obtained by subtracting a result of the third AD conversion from a result of the first AD conversion, and digital data, which is obtained by subtracting a result of the fourth AD conversion from a result of the second AD conversion, and generates imaging data on the basis of the selected digital data.

According to another embodiment of the invention, there is provided a camera system including: a solid-state imaging device; an optical system that forms an image of a subject on the solid-state imaging device; and a signal processing circuit that processes an output image signal of the solid-state imaging device. The solid-state imaging device has a pixel circuit including a photoelectric conversion device and an amp device that outputs electric charges, which are photoelectrically converted by the photoelectric conversion device, through electric potential modulation of an output signal line, and a reading section including an AD (analog digital) conversion circuit that compares an output level of the signal line with a reference signal which changes with a regular slope and digitalizes an output signal on the basis of a timing at which a previously-defined relationship is satisfied between the output signal and the reference signal. The reading section has a function of respectively performing first AD conversion, which is based on a first slope, and second AD conversion, which is based on a second slope, as AD conversion of imaging signals of pixels, and a function of further performing third AD conversion, which is based on the first slope, and fourth AD conversion, which is based on the second slope, as AD conversion of zero signals. The reading section selects, for each pixel, any one of pieces of digital data, which is obtained by subtracting a result of the third AD conversion from a result of the first AD conversion, and digital data, which is obtained by subtracting a result of the fourth AD conversion from a result of the second AD conversion, and generates imaging data on the basis of the selected digital data.

According to the embodiments of the invention, it is possible to perform the AD conversion at a high resolution and at a high speed, and thus it is possible to obtain the high quality imaging data in which the longitudinal streaks are appropriately canceled. Moreover, it is also possible to suppress a decrease in the frame rate by preventing the amount of horizontal transfer from increasing.

BRIEF DESCRIPTION OF THE DRAWINGS

FIG. 3A is a diagram illustrating a timing chart of the pixel circuit of FIG. 2.

FIG. 3B is a diagram illustrating a timing chart of the pixel circuit of FIG. 2.

FIG. 3C is a diagram illustrating a timing chart of the pixel circuit of FIG. 2.

FIG. 3D is a diagram illustrating a timing chart of the pixel circuit of FIG. 2.

FIG. 4 is a conceptual diagram of a rolling shutter.

FIG. 6 is a diagram illustrating a simplest example of a comparison/determination unit in the AD conversion circuit of FIG. 5.

FIG. 7A is a timing chart illustrating an operation example of the comparison/determination unit of FIG. 6.

FIG. 7B is a timing chart illustrating an operation example of the comparison/determination unit of FIG. 6.

FIG. 7C is a timing chart illustrating an operation example of the comparison/determination unit of FIG. 6.

FIG. 7D is a timing chart illustrating an operation example of the comparison/determination unit of FIG. 6.

DESCRIPTION OF THE PREFERRED EMBODIMENTS

Hereinafter, embodiments of the invention will be described with reference to the accompanying drawings.

In addition, description will be given in order of the following items.
1. General Circuit Operation of Image Sensor
2. First Embodiment (First Exemplary Configuration of Readout circuit)
3. Second Embodiment (Second Exemplary Configuration of Readout circuit)
4. Third Embodiment (Third Exemplary Configuration of Readout circuit)
5. Fourth Embodiment (Camera System)

Figure 1:
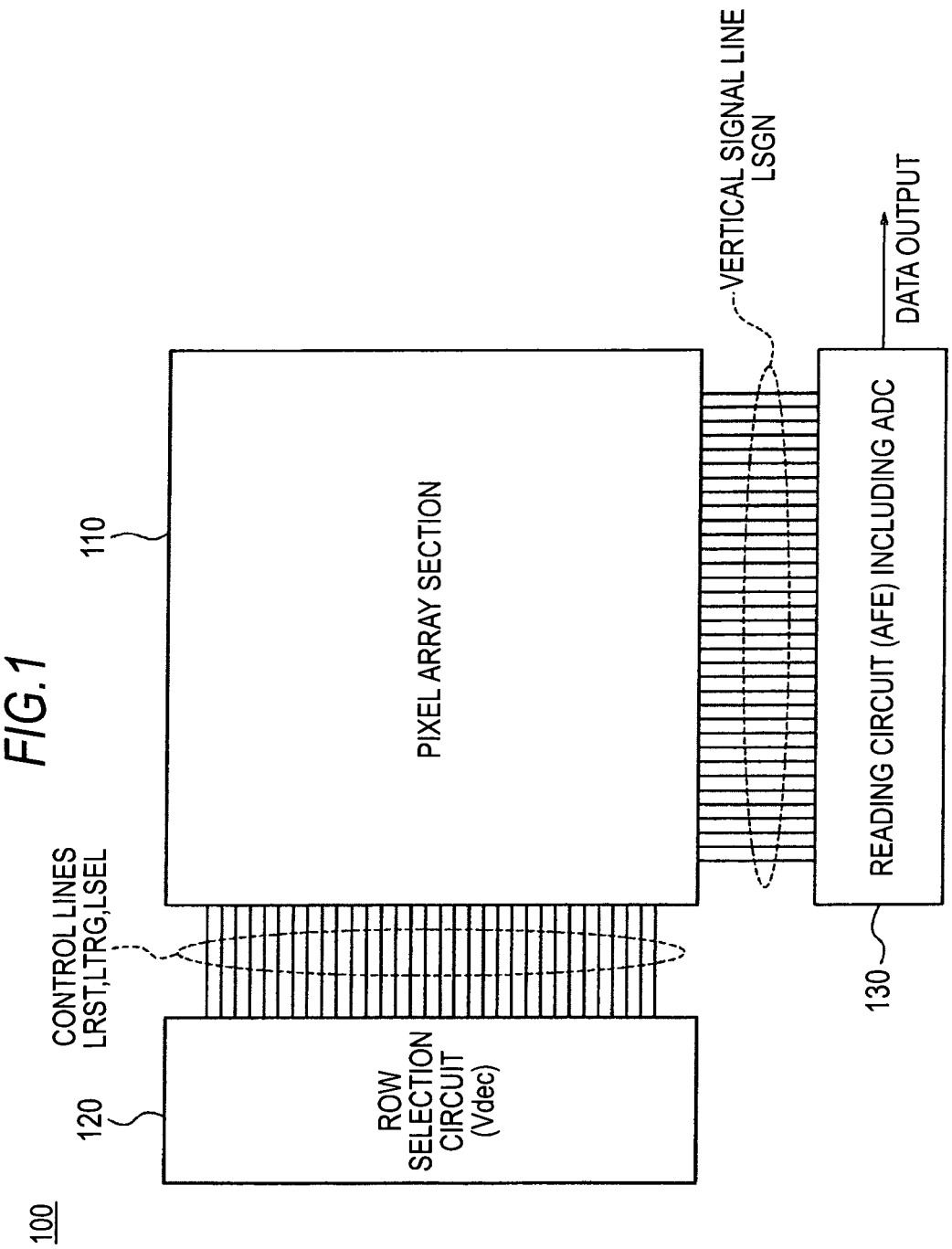
FIG. 1 is a diagram illustrating an exemplary configuration of a CMOS image sensor (a solid-state imaging device) using pixel circuits according to an embodiment of the invention.

FIG. 1 is a diagram illustrating an exemplary configuration of a CMOS image sensor (a solid-state imaging device) using pixel circuits according to an embodiment of the invention.

A CMOS image sensor 100 includes a pixel array section 110, a row selection circuit (Vdec) 120 serving as a pixel driving section, and a column reading circuit (AFE) 130.

The pixel array section 110 includes plural pixel circuits 110A which are arranged in two dimensions (matrix) of M rows×N columns.

Each pixel circuit 110A according to the embodiment basically includes a photoelectric conversion device, a transfer transistor, a reset transistor, an amp transistor, a selection transistor, an accumulation node, and an FD (a floating diffusion).

A specific configuration of the pixel circuit 110A will be described in detail later.

A set of a transfer line 140 (LTRG), a reset line 150 (LRST), and a row selection line 160 (LSL) is provided for each row of the pixel array in the pixel array section 110.

The number of control lines of each of the transfer lines 140 (LTRG), the reset lines 150 (LRST), and the row selection lines 160 (LSL) is M.

The transfer lines 140 (LTRG), the reset line 150 (LRST), and the row selection lines 160 (LSL) are driven by the row selection circuit 120.

The row selection circuit 120 controls the operations of pixels arranged on an arbitrary row in the pixel array section 110. The row selection circuit 120 controls the pixel circuits through the transfer lines 140 (LTRG), the reset lines 150 (LRST), and the row selection lines 160 (LSL).

The column reading circuit 130 receives data in pixel rows, subjected to reading control performed by the row selection circuit 120, through the vertical signal lines (LSGN) 170, and transfers the received data to a subsequent signal processing circuit.

The vertical signal lines 170 are connected to a constant current circuit or the reading circuit 130.

The column reading circuit 130 includes a CDS circuit, a ramp signal generation circuit, a reading circuit including AD conversion circuits which are disposed to correspond to the respective columns, and the like.

Further, the ramp signal generation circuit has a function of generating a first slope signal and a second reference signal which are reference signals with different slopes to be described later.

The CMOS image sensor 100 has a function of separately extracting zero signals by using the respective slopes from the AD conversion results based on plural slopes of displacement in the reference potential and correcting digital data corresponding to the slopes at the time of the conversion in the imaging chip.

Further, the CMOS image sensor 100 performs the selection of each pixel from the result of the AD conversion, which is performed multiple times, for each column before horizontal transfer.

Thereby, the CMOS image sensor 100 is configured to be able to suppress a decrease in frame rate by preventing the amount of the horizontal transfer from increasing.

Then, the CMOS image sensor 100 is configured to be able to perform the AD conversion at a high resolution and at a high speed in the CMOS image sensor and obtain high quality imaging data in which the longitudinal streaks are appropriately canceled.

Hereinafter, a description will be given of a specific exemplary configuration of the pixel circuit in the CMOS image sensor 100 having the above-mentioned configuration.

Figure 2:
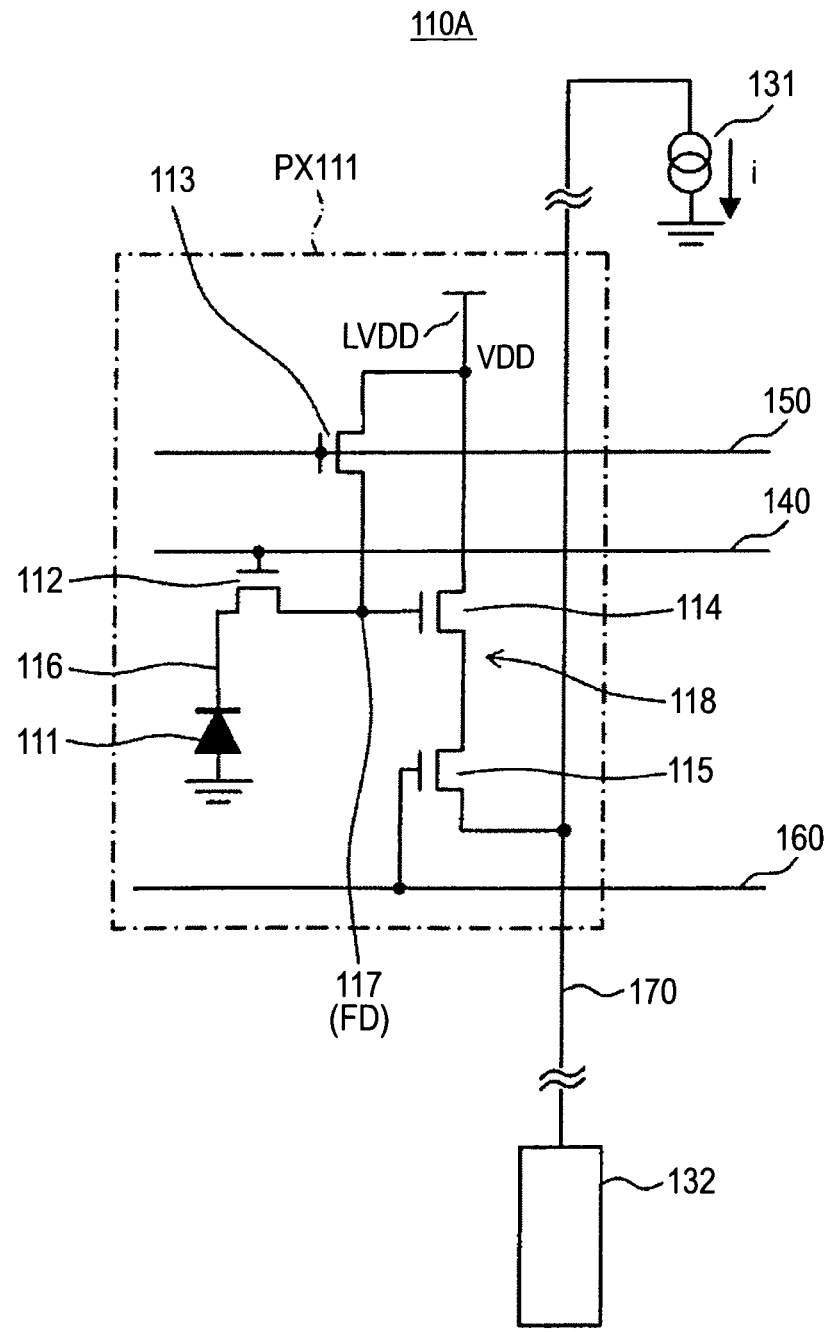
FIG. 2 is a diagram illustrating the pixel circuit of the CMOS image sensor according to a first embodiment of the invention.

FIG. 2 is a diagram illustrating the pixel circuit of the CMOS image sensor according to the embodiment of the invention.

In the pixel circuit 110A of FIG. 2, the constituent section, which is indicated by the dashed line, is a pixel circuit PX111 as one unit.

The unit pixel circuit PX111 has a photodiode 111 as a photoelectric conversion device, a transfer transistor 112, a reset transistor 113, an amplifier (amp) transistor 114, and a selection transistor 115.

The unit pixel circuit PX111 has an accumulation node 116, and a floating diffusion (FD) node 117.

Further, an amp device (an amplifier device) 118 is formed by the amp transistor 114, and an input node of the amp device 118 is formed by the FD node 117.

The transfer transistor 112 of the first embodiment is connected between the photodiode 111 and the FD node 117 as an output node. The gate electrode of the transfer transistor 112 is connected to the transfer line 140 in common.

The reset transistor 113 is connected between a power supply line LVDD and the FD node 117, and its gate electrode is connected to the reset line 150.

The FD node 117 is connected with the gate of the amp transistor 114. The amp transistor 114 is connected to the vertical signal line 170 through the selection transistor 115, and constitutes a source follower together with a constant current circuit 131 other than the unit pixel portion.

The gate electrode of the selection transistor 115 is connected to the row selection line 160. Then, the source of the selection transistor 115 is connected to the vertical signal line 170.

The vertical signal line 170 is connected with the constant current circuit 131 and a reading circuit 132.

A reading system includes, for example, the vertical signal line 170, the constant current circuit 131, the reading circuit 132, and the like.

In the unit pixel circuit PX111 of the pixel circuit 110A having such a configuration, light incident on the silicon substrate of the pixel generates pairs of electrons and holes, and the photodiode 111 corrects and accumulates the electrons, which are present in the substrate, in the accumulation node 116.

The electrons are finally read as a signal to each vertical signal line 170.

In the CMOS imager, such pixels are arranged in a matrix. Thus, each vertical signal line 170 is shared by plural pixels arranged in the column direction. In addition, each transfer line 140 which is a gate control line for turning on/off the transistors, each reset line 150, and each row selection line 160 are shared by plural pixels arranged in the row direction.

The pixels are integrally accessed on a row-by-row basis by driving the transfer lines 140 which are gate control lines, the reset lines 150, and the row selection lines 160.

Analog signals are output by reading them out through the vertical signal lines 170, sensing them through the reading circuit 132, and performing the AD conversion thereon.

Hereinafter, specific operations of accumulating and reading electric charges will be described with reference to FIG. 2.

FIGS. 3A to 3D are diagrams illustrating timing charts of the pixel circuit of FIG. 2.

FIG. 3A shows the level of the reset line 150. FIG. 3B shows the level of the transfer line 140. FIG. 3C shows the level of the row selection line 160. FIG. 3D shows the level of the vertical signal line 170.

Before the charge accumulation, first the pixels are reset. In this case, the reset line 150 and the transfer line 140 are set to the high level, and the reset transistor 113 and the transfer transistor 112 are turned on. The reset is for example an operation that transfers a power supply voltage of 3V to the accumulation node 116 of the photodiode 111.

Thereby, the potential of the accumulation node 116 rises, and the electrons accumulated therein are extracted.

In the recent popular HAD (Hole-Accumulation Diode) structure, the accumulation node 116 is formed by interposing the n-type doped diffusion layer between p-type layers. Hence, the electrons are entirely discharged, and are completely depleted.

Thereafter, by setting the transfer line 140 to the low level, the transfer transistor 112 is turned off. Then, the accumulation node 116 is in a floating state, and new charge accumulation starts. The reset transistor 113 is also normally turned off during the charge accumulation.

Generally, the operation of resetting the pixels is used as an electronic shutter operation of the CMOS image sensor.

Next, the operation of reading out the accumulated charges will be described.

First, the row selection line 160 is set to the high level, the selection transistor 115 is turned on, and then the vertical signal line 170 is connected with the amp transistor 114 of each pixel.

Here, the vertical signal line 170 connected to the amp transistor 114 and the constant current circuit 131 forms a source follower circuit. Then, a potential Vfd of the FD node 117 as an input thereof and an electric potential Vsl of the vertical signal line 170 as an output thereof satisfy a linear relationship in which the variable ratio thereof is approximate to 1.

That is, assuming that the current value of the constant current circuit 131 is i, idealistically, the following expression is established.

$i=(1/2)*\beta*(Vfd-Vth-Vsl)^2$, where $\beta$ is a constant

Here, (Vfd−Vth−Vsl) is constant, and thus the change of Vfd is linearly reflected in Vsl.

Here, by setting the reset line 150 to the high level, the reset transistor 113 is turned on, and then the power supply voltage of 3V is transferred to the FD node 117.

Further, by setting the reset line 150 to the low level, the reset transistor 113 is turned off, and then the reading circuit 132 including the AD conversion circuit senses the electric potential Vsl of the vertical signal line 170. In such a manner, the electric charges corresponding to the signal level at the time of the reset are read out, and are stored in the circuit.

Next, by setting the transfer line 140 to the high level, the transfer transistor 112 is turned on, the electrons, which are accumulated in the accumulation node 116, flow into the FD node 117 as an input node of the source follower.

At this time, when the potential of the FD node 117 is sufficiently high, the electrons, which are accumulated in the accumulation node 116, are entirely discharged to the FD node 117, and are completed depleted in the accumulation node 116.

Here, by setting the transfer line 140 to the low level, the transfer transistor 112 is turned off, and then the reading circuit 132 performs second sensing for the electric potential of the vertical signal line 170. This is the reading control of the accumulation signal.

The difference between the first sensing and the second sensing accurately reflects the amount of charges which are accumulated in the accumulation node 116 by exposure of the photodiode 111.

The CMOS imager digitalizes the difference, and outputs the digitalized difference as a signal value of each pixel. The time necessary to accumulate electrons in each pixel is a period of time between the reset operation and the reading operation. Specifically, the time is a period of time T1 from when the transfer transistor 112 is turned off after the reset till when the transfer transistor 112 is turned off in the reading.

Meanwhile, in the pixel array of the normal CMOS imager, as described above, the reset line 150, the transfer line 140, and the row selection. line 160 are shared among the pixels for each row. That is, the reset or the reading of the pixels is integrally performed on a row-by-row basis.

Further, the vertical signal line 170 is shared among the pixels for each column, and thus is connected to the pixels of the selected row by the selection transistor 115.

Accordingly, in order to read out the data of all pixels (corresponding to one frame), it is necessary to read and output the data from the pixels for each row by sequentially selecting rows from the first row to the last row in the pixel array.

Generally, in the CMOS imager, the reset and the reading are simultaneously performed in the same order for each row. Thereby, the electron accumulation time is made to be the same for all pixels.

Such an electronic shutter mechanism is called a rolling shutter, and is general in the CMOS imager.

FIG. 4 is a conceptual diagram of the rolling shutter.

In FIG. 4, the vertical axis represents the address of each row in the pixel array, and the horizontal axis represents the passage of time.

In FIG. 4, the dashed line L11 represents a situation in which the reset is sequentially performed in accordance with the row addresses.

On the other hand, the continuous line L12 represents a situation in which the reading is sequentially performed in accordance with the row addresses.

The period of time T11 from the dashed line L11 to the continuous line L12 is the electron accumulation period, and this is the same for all rows.

As described above, the electron accumulation time of the CMOS imager depends on the setting of the timing of the reset and the reading.

For example, in the video recording status, the reading cycle is fixed in the one frame period. Therefore, by changing the reset timing, it is possible to arbitrarily set the exposure time within the range of less than one frame period.

Meanwhile, the frame rate in the video recording status and the like is limited by the data reading time corresponding to one frame.

The limitation is defined by a total reading time. The total reading time is a time which is necessary until the selection of each row is performed in the row selection line 160, the reading of the reset signal and the accumulation signal is performed, and the reading is performed on the next row as shown in FIGS. 3A to 3D.

The main factor, which defines the reading time, is a time necessary for the AD conversion. The above-mentioned times constitute the reading time corresponding to one row, and the total reading time, during which the reading is sequentially performed on all the rows, is a reading time corresponding to one frame.

<1. General Circuit Operation of Image Sensor>

Figure 5:
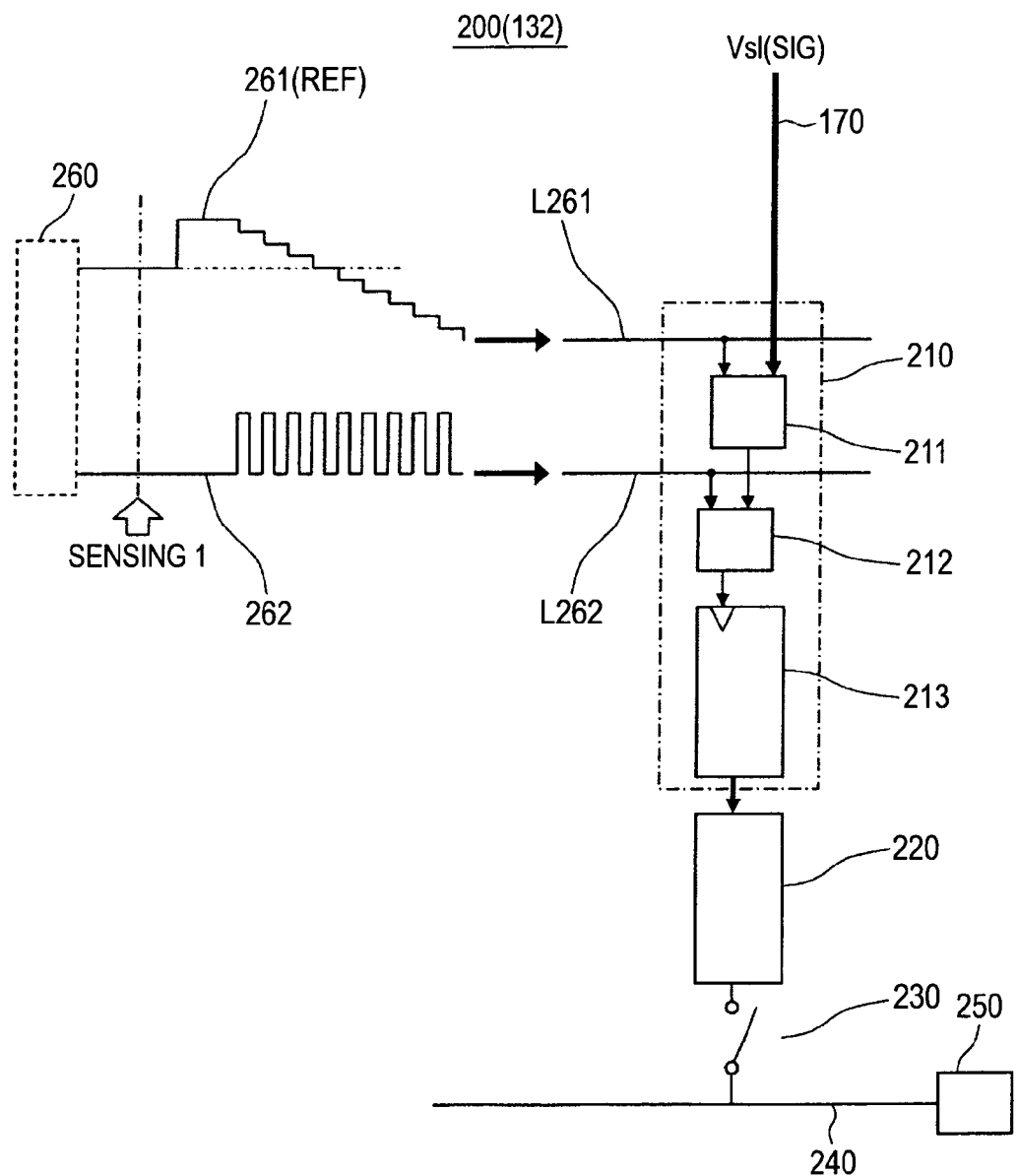
FIG. 5 is a diagram illustrating a brief overview of a configuration of the reading circuit corresponding to each column in a general image sensor.

FIG. 5 is a diagram illustrating a brief overview of a configuration of the reading circuit corresponding to each column in a general image sensor.

In FIG. 5, the reading circuit is indicated by the reference numeral 200.

The reading circuit 200 as shown in FIG. 5 has an AD conversion circuit 210, a latch 220, a transfer switch 230, transfer bus 240, and an output circuit 250.

The AD conversion circuit 210 includes a comparison/determination unit 211, a clock gate 212, and a counter 213.

The reading circuit 200 of FIG. 5 further includes a ramp signal generation circuit 260.

The ramp signal generation circuit 260 has a function of generating a ramp signal 261 and a clock signal 262, and outputs the ramp signal 261 to a ramp line L261 and outputs the clock signal 262 to the clock line L262.

The reset signal and the accumulation signal, which are readout from the pixel PX111, are respectively converted into digital signals through the AD conversion circuit 210. Then, the digital values of the difference between the reset signal and the accumulation signal are output as net accumulation signal values to the latch 220, and are latched.

The output signal values corresponding to the latched one row are sequentially transferred to the transfer bus 240 of the horizontal direction by the transfer switch 230, and are output to the outside of the chip through the output circuit 250.

During the output of the row data, the AD conversion and the pixel access of the subsequent row are simultaneously performed in parallel.

That is, the row reading process performed by the pixel access and the AD conversion includes a data output process and a pipeline operation.

As described above, the AD conversion circuit 210 includes the comparison/determination unit 211, the clock gate 212, and the counter 213.

The analog signal Vsl, which is read out in the vertical signal line 170 from each pixel, is input to the comparison/determination unit 211, and its level is compared with that of the ramp signal 261 which is transferred to the ramp line L261.

The electric potential of the ramp signal 261 decreases by a certain amount in synchronization with the clock signal 262 which is transferred to the clock line L262.

On the other hand, the same clock signal 262 passes through the clock gate 212, and advances the count of the counter 213.

Here, when the previously-defined relationship is satisfied between the ramp signal 261 and the analog signal Vsl of the vertical signal line 170, the output of the comparison/determination unit 211 is inverted to close the clock gate 212, and then stops the count of the counter 213.

The electric potential of the ramp signal 261 at the time of the output inversion is derived from the count value of the counter 213. Then, the electric potential of the vertical signal line 170 is derived from the electric potential of the ramp signal 261. On the basis of this relationship, the AD conversion of the analog signal SIG is implemented.

Further, at the time of the conversion of the pixel signal, first the reset signal is read out from the pixel circuit PX111, and the electric charges of the retention capacity, which is disposed in the comparison/determination unit 211, are adjusted so as to achieve the balance between the ramp signal 261 and the reset output.

Thereafter, the reading of the pixel signal is performed, and the ramp line L261 is continuously driven, thereby acquiring the difference between the pixel signal and the reset signal as a digital signal from the output inversion timing of the comparison/determination unit 211.

In such a manner, a so-called CDS (a correlated double sampling) is implemented, and the variation in the reset level, which occurs for each pixel or for each reading, is canceled.

FIG. 6 is a diagram illustrating a simplest example of the comparison/determination unit in the AD conversion circuit of FIG. 5.

The comparison/determination unit 211 of FIG. 6 has switches SW211 and SW212, capacitors C211 and C212, an inverter IV211, and a supply line L211 of a reference voltage REF211.

The terminal a of the switch SW211 is connected to the first terminal of the capacitor C121 and the first terminal of the capacitor C122. The terminal b thereof is connected to the input line of the signal SIG which is transferred through the vertical signal line 170.

The second terminal of the capacitor C211 is connected to the input terminal of the inverter IV211 and the terminal a of the switch SW212.

The output terminal of the inverter IV211 is connected to the terminal b of the switch SW212.

The output terminal of the inverter IV211 is connected to the one input terminal of the clock gate 212.

Here, an exemplary operation of the comparison/determination unit of FIG. 6 will be described.

FIGS. 7A to 7D are timing charts illustrating the exemplary operation of the comparison/determination unit of FIG. 6.

FIG. 7A shows the signal potential of the terminal SIG connected to the vertical signal line 170. FIG. 7B shows the ON/OFF state of the switch SW211. FIG. 7C shows the ON/OFF state of the switch SW212. FIG. 7D shows the reference voltage REF211.

First, while the reset signal RST is input as the signal SIG, the input/output of the inverter IV211 is shorted by turning on (closing) the switch SW211, and the switch SW212 is closed by setting the input to an inversion threshold level.

At this time, the capacitor C211 as a retention capacity retains electric charges corresponding to the reset signal RST.

Next, when the reading signal of each pixel is input as the signal SIG, the level of the node ND211 decreases, and the output of the inverter IV211 becomes logical "1".

Here, when the reference voltage REF211 (261) is increased by turning on (closing) the switch SW211, due to the coupling with the capacitor C212, the amount of displacement thereof raises the level of the node ND211 with a constant ratio $\alpha$.

When the node ND211 returns to the level of the reset signal, the output of the inverter IV211 is inverted to logical "0".

This output inversion occurs when the difference $\Delta$VSIG between the reset signal and the reading signal of the pixel becomes equal to a value which is obtained by multiplying the amount of voltage displacement $\Delta$VREF of the reference voltage REF211 by $\alpha$.

Further, the reference voltage REF211 is firstly decreased before it is increased. The reason is that the offset for reliably setting the output of the inverter IV211 to logical "1" at the time of starting ramping is performed. In such a manner, even in a dark status, even when the signal becomes zero, or even when the signal becomes a negative value because it includes noise, reliable detection is guaranteed.

Furthermore, in a circuit configuration of the comparison/determination unit, there may be various variations. For example, in JP-A-2008-136042 mentioned above, a comparison/determination unit using a two-input comparator is used.

In this case, through the reset operation of the comparator, the electric charges corresponding to the reset signal of the pixel are accumulated in the retention capacitor interposed between the vertical signal line and the comparator.

In such a circuit, the displacement in the reference line has the same direction as the displacement in the signal line, and thus $\alpha$ is 1. That is, when the difference between the reset signal and the reading signal of the pixel becomes equal to the amount of the voltage displacement of the reference line, the output of the comparison/determination unit is inverted.

Further, instead of providing the counter for each column, the stored value of the common counter may be copied and transferred to the latch provided for each column. In addition, comparison inversion may be performed after the pixel signal is amplified by providing the input section of the comparison/determination unit with a column amp.

The above description has been hitherto given of the example of the circuit configuration of the general image sensor which is provided with the AD conversion circuit for each column. However, in the embodiment of the invention, while still employing such a circuit, it is possible to add a new function thereto.

<2. First Embodiment>

Figure 8:
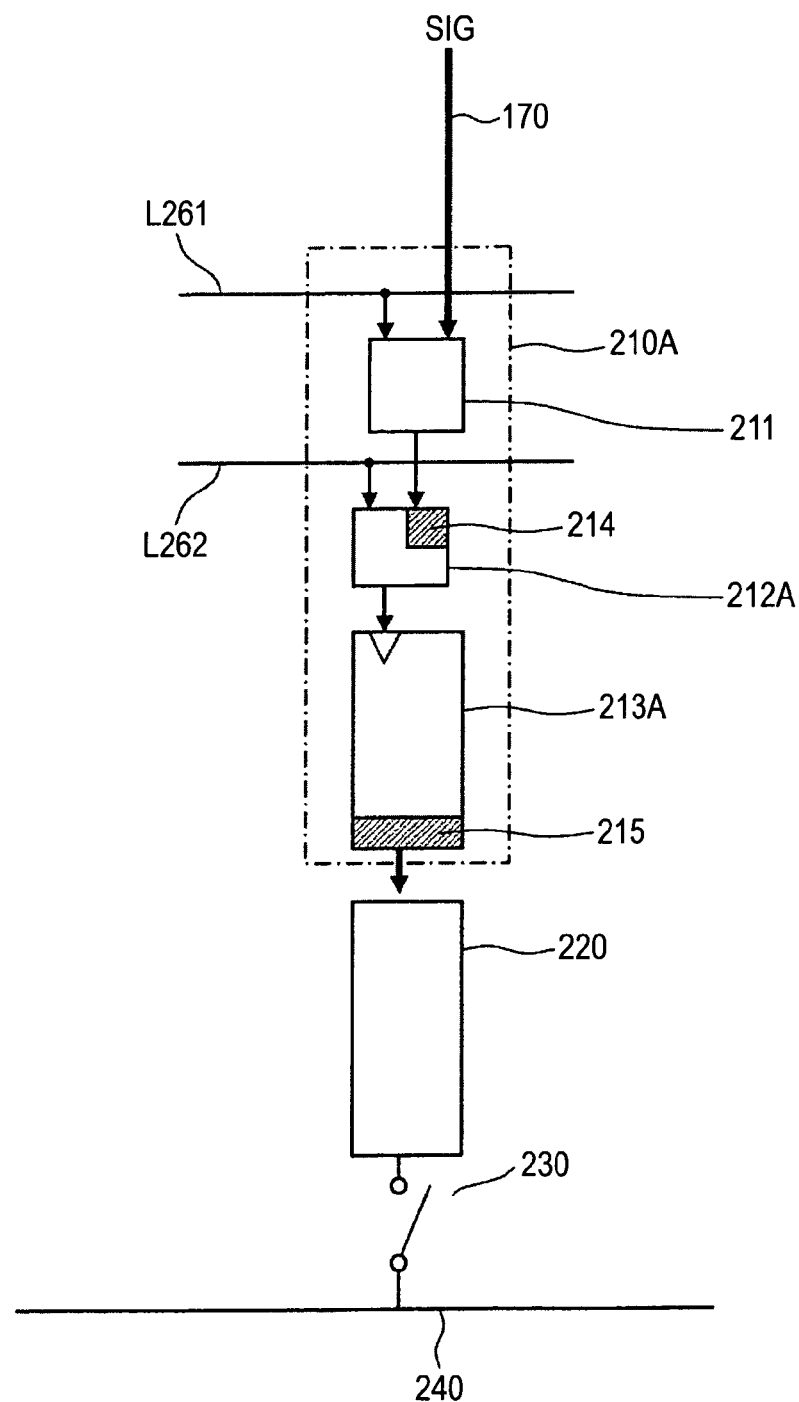
FIG. 8 is a diagram illustrating a brief overview of a configuration of the reading circuit corresponding to each column according to the first embodiment of the invention.

FIG. 8 is a diagram illustrating a brief overview of a configuration of the reading circuit corresponding to each column according to a first embodiment of the invention.

In a reading circuit 200A of FIG. 8, an AD conversion circuit 210A includes a comparison/determination unit 211A, a clock gate 212A, and a counter 213A.

In the comparison/determination unit 211A, for example, a two-input comparator type is employed, and thus the counter 213 is provided for each column.

Since the clock gate 212A additionally includes a latch circuit 214, a clock inhibit signal from the comparison/determination unit 211A is latched. In such a manner, it is possible to selectively cut off the counter 213A from the clock supply line without regard to the output of the following comparison/determination unit 211A.

Furthermore, in accordance with the storage amount of the latch 214, the reset signal of the counter, which is not shown in the drawing, is also selectively cut off.

The AD conversion circuit 210A additionally including such a circuit has a function of selectively storing the counter values of the columns of which values are specified by firstly performing the comparison and determination.

Further, since the counter 213A additionally includes a latch 215 for a one-bit flag, the flag is generated in accordance with the storage amount of the above-mentioned latch circuit 214.

This flag is transferred together with the pixel data, which is obtained after the AD conversion, to the output calculation circuit through a latch 220.

FIGS. 9A to 9E are diagrams illustrating operation sequences of the row reading process by using the AD conversion circuit of the reading circuit of FIG. 8.

Figure 9:
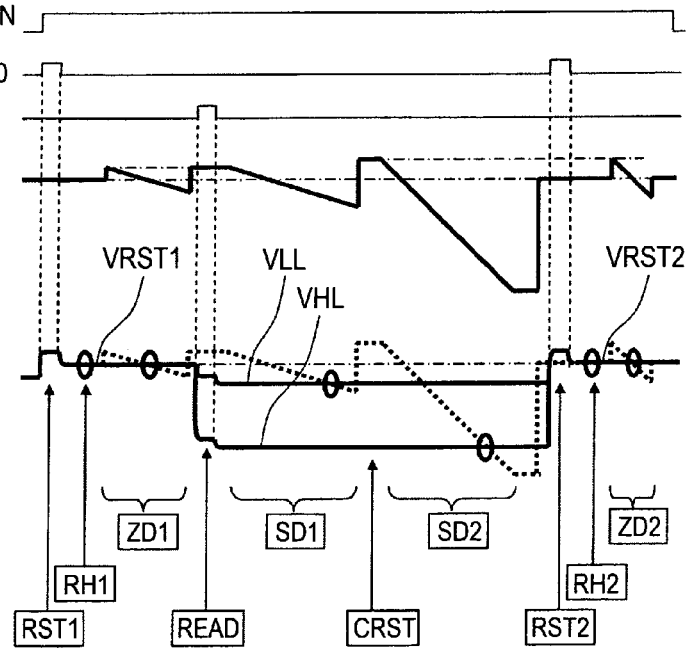
FIG. 9A is a diagram illustrating an operation sequence of the row reading process by using the AD conversion circuit of the reading circuit of FIG. 8.
FIG. 9B is a diagram illustrating an operation sequence of the row reading process by using the AD conversion circuit of the reading circuit of FIG. 8.
FIG. 9C is a diagram illustrating an operation sequence of the row reading process by using the AD conversion circuit of the reading circuit of FIG. 8.
FIG. 9D is a diagram illustrating an operation sequence of the row reading process by using the AD conversion circuit of the reading circuit of FIG. 8.
FIG. 9E is a diagram illustrating an operation sequence of the row reading process by using the AD conversion circuit of the reading circuit of FIG. 8.

FIG. 9A shows the level of the row selection line 160. FIG. 9B shows the level of the reset line 150. FIG. 9C shows the level of the transfer line 140.

FIG. 9D shows the level of the ramp signal 261 of the ramp line L261. FIG. 9E shows the level of the signal SIG of the vertical signal line 170.

As described above, through the row selection line 160, the source follower outputs of pixels of a specific row are transferred to the vertical signal line 170.

Through the reset line 150, the FD node 117 as an input portion of the pixel source follower is reset by pulse application, and the reset level is output to the vertical signal line 170.

Through the transfer line 140, the electric charges, which are accumulated in the photodiode 111 of the pixel by the pulse application, are transferred to the FD node 117, and the pixel signal is output to the vertical signal line 170 through the source follower.

The ramp line L261 functions as the reference line that applies the reference potential to the comparison/determination unit 211A, and is swept two times for each of two kinds of slope, that is, is swept a total of four times.

In FIGS. 9A to 9E, the process RST1 is a process of resetting the pixel FD node 117 mentioned above. Through the reset process RST1, the reset signal VRST1 of the selection pixel is output to the vertical signal line 170.

The process RH1 is a process of storing the electric charges corresponding to the reset signal of the pixel in the retention capacitor C211 in the comparison/determination unit 211A by resetting the comparator of the comparison/determination unit 211A in a state where the reset signal VRST1 of the pixel is on the vertical signal line.

The process ZD1 is a process of acquiring the zero signal by sweeping the ramp line (the reference line) L261 in accordance with the first gentle slope from the position at which a certain offset is performed.

The signal of the vertical signal line 170 is not changed by the processing of the process RH1 in a state where it is the reset signal VRST1. The signal acquired herein is the zero signal, and the offset of the comparator in the comparison/determination unit 211A or the longitudinal streak data depending on the delay of the determination output is acquired.

At this time, the counter 213A counts down.

The process READ is the process of reading the pixel signal mentioned above. Here, an output VLL of the pixel for low illumination and an output VLH of the pixel for high illumination are respectively described.

The process SD1 is a process of acquiring the pixel signal by sweeping the ramp line (the reference line) L261 in accordance with the first gentle slope from the offset position which is the same as that of the process ZD1.

Here, the difference between the signals VLL and VRST1 is acquired, and is a net pixel signal corresponding to CDS.

At this time, the counter 213A counts up. As a result, the stored value of the counter is a value which is obtained by subtracting the zero signal acquired in the process ZD1 from the pixel signal acquired in the process SD1.

The process CRST is a process of resetting the counter 213A. Although the values of the pixels for low illumination are specified at the time of completion of the process SD1, the pixels for high illumination are saturated, and thus the values thereof are unspecified.

Here, first the latch circuit 214 shown in FIG. 8 is set. Then, in the AD conversion circuit 210A of each column of which a value is specified to correspond to the pixel for low illumination, the clock line L262 or the reset line is cut off from the counter 213A, thereby fixedly storing the stored value of the counter 213A.

In addition, in the latch 215 for flag added to the counter 213A, the flag, which represents that the value is specified at this time, is set.

On the other hand, the counter 213A corresponding to the pixel for high illumination is reset to an initial value, and the AD conversion newly starts.

The process SD2 is a process of acquiring the pixel signal by sweeping the ramp line (the reference line) L261 in accordance with the second steep slope from the certain offset position.

Here, the difference between the signals VHL and VRST1 is acquired, and is a net pixel signal corresponding to CDS. At this time, the counter 213A counts up.

The process RST2 is a process of resetting the pixel FD node 117 mentioned above again. Thereby, the reset signal VRST2 of the selection pixel is output to the vertical signal line 170.

The process RH2 is a process of storing the electric charges corresponding to the reset signal of the pixel in the retention capacitor C211 in the comparison/determination unit 211A by resetting the comparator of the comparison/determination unit 211A again in a state where the reset signal VRST2 of the pixel is on the vertical signal line 170.

The process ZD2 is a process of acquiring the zero signal by sweeping the ramp line (the reference line) L261 in accordance with the second steep slope from the position at which a certain offset is performed like the process SD2.

The signal of the vertical signal line 170 is not changed by the processing of the process RH2 in a state where it is VRST2. The signal acquired herein is the zero signal, and the offset of the comparator in the comparison/determination unit 211A or the longitudinal streak data depending on the delay of the determination output is acquired.

At this time, the counter 213A counts down. As a result, the stored value of the counter 213A is a value which is obtained by subtracting the zero signal acquired in the process ZD2 from the pixel signal acquired in the process SD2.

Further, the processing in and after the process RH2 is for acquiring the zero signal and detecting the longitudinal streaks.

Accordingly, the level of the vertical signal line 170 at this time is not necessarily equal to the reset level.

Here, focusing on stable operations of the circuits, the operation of the process RST2 is unnecessarily performed. However, it is possible to omit the operation of the process RST2, and in the case of omitting the operation, sometimes the longitudinal streak component may be more accurately detected. Alternatively, instead of the processing of the process RST2, the vertical signal line 170 may be forcibly fixed to a constant level.

As the result of such a reading sequence, in the counter 213A corresponding to the pixel for low illumination, the difference between the process SD1 and the process ZD1 is stored, and a flag thereof is set.

On the other hand, in the counter 213A corresponding to the pixel for high illumination, the difference between the process SD2 and the process ZD2 is stored, and a flag thereof is not set. The counter values and the flags are transferred to the subsequent latch ahead of reading out the next row, and are horizontally transferred one after another to the output calculation circuit.

The output calculation circuit corrects a gain of the output on the basis of the flag.

For example, if the second slope has a tilt 16 times that of the first slope, 4-bit shift is applied to the data, which is extracted by using the second slope and in which the flag is not set, the 16-fold gain is applied thereto, and the data is output.

In this case, although each AD conversion is performed at a 10-bit grayscale, 14-bit wide output is achieved. Thus, it is possible to simultaneously obtain a high-bit resolution at the low illumination and a large dynamic range of imaging corresponding to even the high illumination.

Further, in the embodiment, not only the digital values, which are obtained by the two kinds of slope, are respectively horizontally transferred, but also the slope selection is performed for each column, thereby transferring only the AD conversion values thereof. Accordingly, there is an advantage in that the horizontal transfer capacity is substantially the same as the normal one.

In the above-mentioned embodiment, the zero signal is acquired in the row reading, and is subtracted from the pixel signal.

This method has an advantage in that it is substantially independent of an increase in the circuit size and is unlikely to be affected by power supply fluctuation or excess random noise.

However, in order to further increase the conversion speed, it may be allowed that two kinds of zero signals are acquired for each frame and are stored in the line memory, and timely subtraction is performed thereon.

<3. Second Embodiment>

Figure 10:
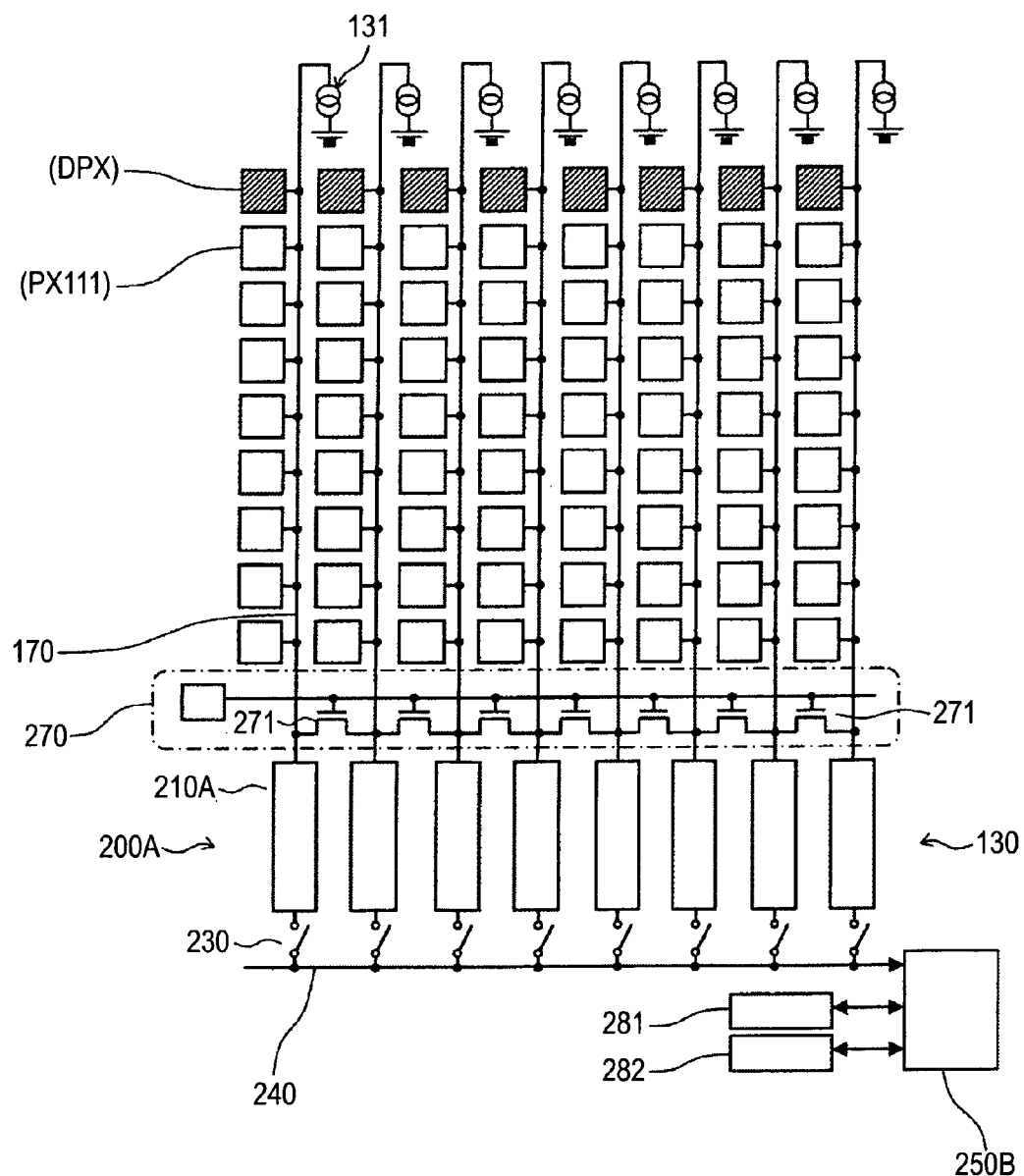
FIG. 10 is a diagram illustrating a brief overview of a configuration of the reading circuit according to a second embodiment of the invention.

FIG. 10 is a diagram illustrating a brief overview of a configuration of the reading circuit corresponding to each column according to a second embodiment of the invention.

In the second embodiment, the configuration of the reading circuit 132, which is connected to each vertical signal line 170, is the same as the reading circuit 200A of FIG. 8 according to the first embodiment.

However, the zero signal is acquired by using each dummy pixel DPX during a blanking period of each frame. In the dummy pixel DPX, the transfer line is not driven, and thus the zero signal is output.

Moreover, in the second embodiment, an equalizing circuit 270 of the vertical signal lines 170 is provided.

The equalizing circuit 270 shorts the respective vertical signal lines 170 by MOSFET switches 271 at the time of acquiring the zero signals, and removes the random noise, which occurs in the source followers of the dummy pixel DPX, through equalization.

Further, it is preferable to acquire the zero signal multiple times for each slope, and by averaging them, it is also possible to reduce the random noise component occurring in the reading circuit 200A.

The zero data, which are read out in accordance with the two kinds of slope during the blanking period, are respectively stored in the line memories 281 and 282 formed by SRAM.

The two kinds of data are read out in the output calculation circuit 250B at the time of the output of the pixel data of corresponding columns, and any one of the two kinds of the zero data is selected, and is subtracted from the pixel data.

FIGS. 11A to 11E are diagrams illustrating operation sequences of the row reading process by using the AD conversion circuit of the reading circuit of FIG. 10.

Figure 11:
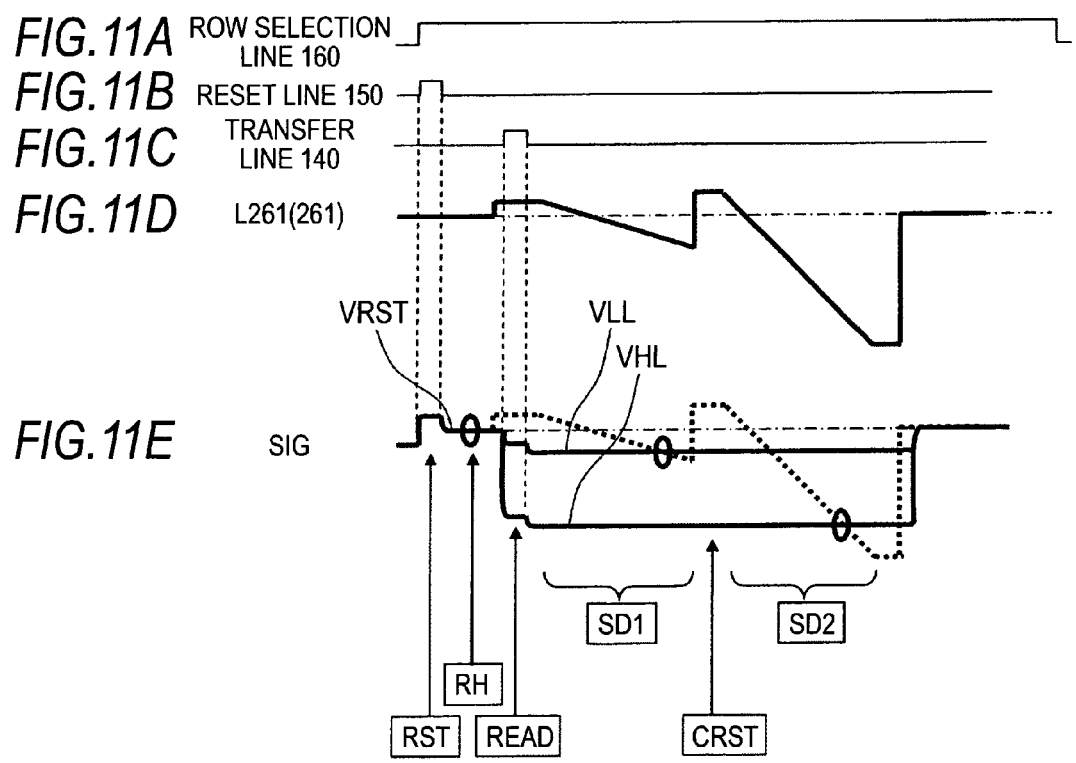
FIG. 11A is a diagram illustrating an operation sequence of the row reading process by using the AD conversion circuit of the reading circuit of FIG. 10.
FIG. 11B is a diagram illustrating an operation sequence of the row reading process by using the AD conversion circuit of the reading circuit of FIG. 10.
FIG. 11C is a diagram illustrating an operation sequence of the row reading process by using the AD conversion circuit of the reading circuit of FIG. 10.
FIG. 11D is a diagram illustrating an operation sequence of the row reading process by using the AD conversion circuit of the reading circuit of FIG. 10.
FIG. 11E is a diagram illustrating an operation sequence of the row reading process by using the AD conversion circuit of the reading circuit of FIG. 10.

FIG. 11A shows the level of the row selection line 160. FIG. 11B shows the level of the reset line 150. FIG. 11C shows the level of the transfer line 140.

FIG. 11D shows the level of the ramp signal 261 of the ramp line L261. FIG. 11E shows the level of the signal SIG of the vertical signal line 170.

Here, the processes ZD1 and ZD2 of acquiring the zero signals in the row reading in the second embodiment are omitted. Thus, the process of holding the reset signal is also performed once in the range from the process RST to the process RH.

Accordingly, it is possible to access the rows at a higher speed, and thus it is possible to increase the frame rate to that extent.

Hereinafter, the processes will be described.

The process RST is a process of resetting the pixel FD node mentioned above. Thereby, the reset signal VRST of the selection pixel is output to the vertical signal line 170.

The process RH1 is a process of storing the electric charges corresponding to the reset signal of the pixel in the retention capacitor C211 in the comparison/determination unit by resetting the comparator of the comparison/determination unit in a state where the reset signal VRST of the pixel is on the vertical signal line 170.

The process READ is the process of reading the pixel signal mentioned above. Here, an output VLL of the pixel for low illumination and an output VLH of the pixel for high illumination are respectively described.

The process SD1 is a process of acquiring the pixel signal by sweeping the ramp line (the reference line) L261 in accordance with the first gentle slope from a certain offset position. Here, the difference between the signals VLL and VRST is acquired, and is a net pixel signal corresponding to CDS.

The process CRST is a process of resetting the counter. Although the values of the pixels for low illumination are specified at the time of completion of the process SD1, the pixels for high illumination are saturated, and thus the values thereof are unspecified.

Here, similarly to the second embodiment, in the AD conversion circuit of each column of which a value is specified to correspond to the pixel for low illumination, thereby fixedly storing the stored value of the counter.

In addition, the flag, which represents that the value is specified, is added to the data-conversion data.

On the other hand, the counter corresponding to the pixel for high illumination is reset to an initial value, and the AD conversion newly starts.

The process SD2 is a process of acquiring the pixel signal by sweeping the ramp line (the reference line) L261 in accordance with the second steep slope from the certain offset position. Here, the difference between the signals VHL and VRST is acquired, and is a net pixel signal corresponding to CDS.

As the result of such a reading sequence, in the counter corresponding to the pixel for low illumination, the conversion value of the process SD1 is stored, and a flag thereof is set.

On the other hand, in the counter corresponding to the pixel for high illumination, the conversion value of the process SD2 is stored, and a flag thereof is not set.

The counter values and the flags are transferred to the subsequent latch ahead of reading out the next row, and are horizontally transferred one after another to the output calculation circuit 250B.

The output calculation circuit 250B performs the subtraction of the zero signal and corrects a gain of the output on the basis of the flag.

For example, if the second slope has a tilt 16 times that of the first slope, the process is performed as follows.

First, the zero signal data, which is extracted by using the first slope, is subtracted from the data which is extracted by using the first slope and in which the setting of the flag is completed, and the subtracted data is output.

On the other hand, the zero signal data, which is extracted by using the second slope, is subtracted from the data which is extracted by using the second slope and in which the setting of the flag is completed. In addition, 4-bit shift is applied to the subtracted data, a 16-fold gain is applied thereto, and the data is output.

Further, the reading sequence at the time of acquiring the zero signal can be easily performed for each slope in a way of not driving the transfer line 140 in FIG. 11C and performing any one sweep of the processes SD1 and SD2.

In addition, it may be allowed that the sweep based on the slope selected at this time is performed twice, and the value thereof is added through the counter, is averaged through the bit shift by using the output calculation circuit 250B, and is then stored in the line memory.

Through this method, by reducing the random noise component in the reading circuit 132 by 3 dB, it is possible to reduce unnecessary noise added to the zero signal.

Further, by reading the zero signals multiple times for each slope as described above, the zero signals may be stored in the line memories after the signals are averaged by the output calculation circuit 250B.

In this case, for example the additional value is accumulated to the line memory, thereby performing the equation through the final reading. In such a manner, it is possible to drastically reduce the random noise component in the reading circuit 132.

In such implementation, the data is transferred from the line memories 281 and 282 in parallel with the horizontal transfer of the data group in the pixel reading.

However, the layout is restricted by the pixel pitch and the number of pixels. Accordingly, in the horizontal transfer of the reading data group which needs a long transfer distance, it is easy to increase the speed of the data transfer from the line memory. In addition, it is possible to transfer the data without limiting the frame rate.

It should be noted that the second embodiment and the third embodiment may be appropriately used in combination. For example, the zeros signal with the gentle slope for low illumination in which a high accuracy is necessary may be acquired in the row reading, and the zero signal with the steep slope may be acquired for each frame. Then, the acquired zero signals may be stored in the line memories, and may be used.

<4. Third Embodiment>

Figure 12:
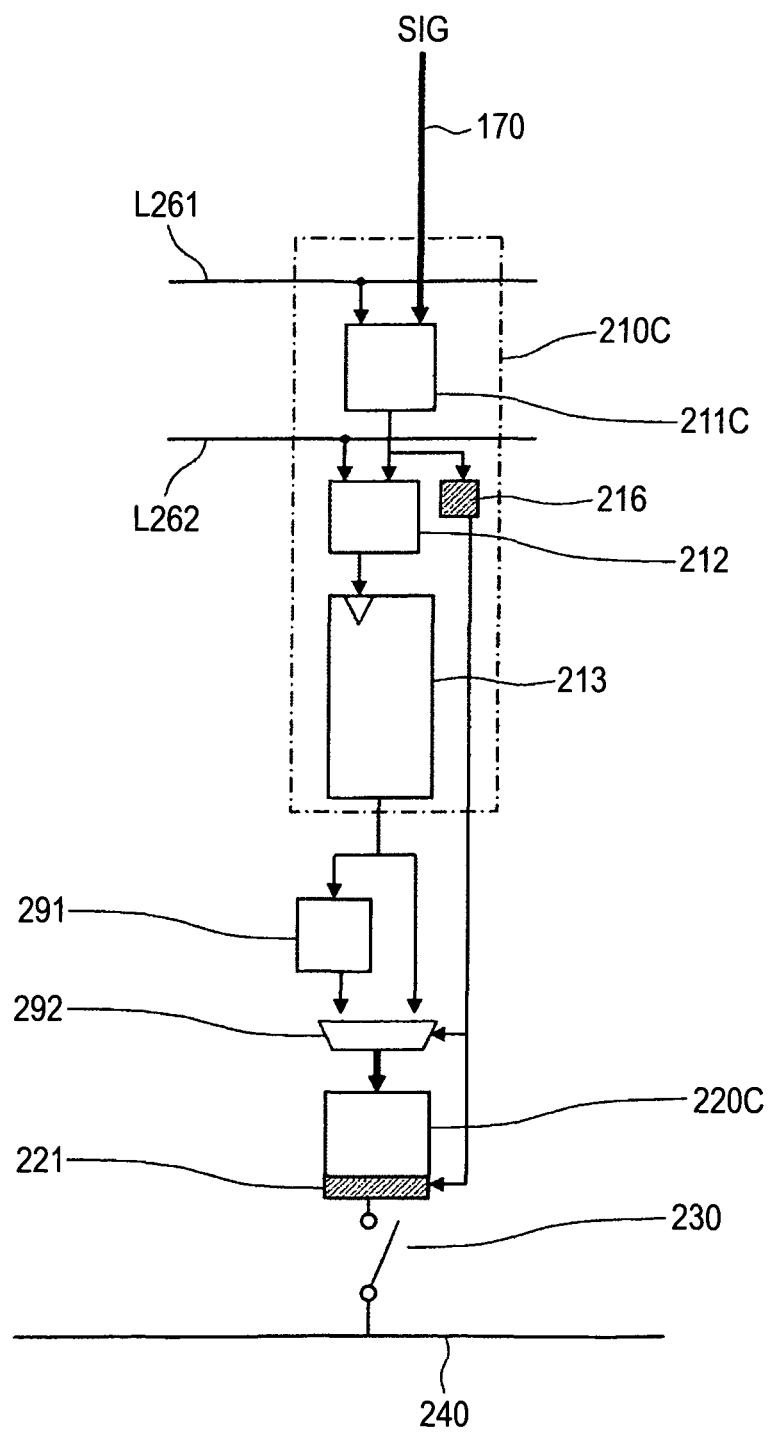
FIG. 12 is a diagram illustrating a brief overview of a configuration of the reading circuit corresponding to each column according to a third embodiment of the invention.

FIG. 12 is a diagram illustrating a brief overview of a configuration of the reading circuit corresponding to each column according to a third embodiment of the invention.

In the third embodiment, when the process SD1 of the AD conversion based on the gentle slope is completed, the conversion result stored in the counter 213 is transferred to a register 291.

Further, in an AD conversion circuit 210C, the output of a comparison/determination unit 211C is stored in a latch 216. Then, all counters are reset, and the AD conversion is performed again with a steep slope for all columns through the process SD2.

At the time of the horizontal transfer, the result is selected by a selector 292 on the basis of the value of the latch 216.

Then, the stored value of the register 291 is selected for each pixel of which the value is specified through the process SDI, and the stored value of the counter 213 is selected for each pixel of which the value is unspecified. Then, the stored values are output to a latch 220C which is a register for horizontal transfer.

Further, the value of the latch 216 is concurrently transferred as a flag to the latch 221, and is horizontally transferred together with the data to the output calculation circuit 250B.

In addition, in the embodiment of FIG. 8 or 12, it is determined whether or not the conversion value is specified on the basis of presence or absence of the output inversion of the comparison/determination units 211A and 211C at the time of completion of the AD conversion based on the gentle slope.

However, it may be possible to implement a circuit which is able to determine that the value, which is obtained after the AD conversion, is unspecified by determining that the value is saturated on the basis of the situation in which the value is equal to or more than a defined value.

In addition, it is needless to say that, although the configurations of the reading circuit according to the first to third embodiments mentioned above are described as separate configurations, such configurations may be appropriately used in combination.

For example, the AD conversion circuit according to the third embodiment may be applied in combination with other embodiments.

The solid-state imaging devices including the reading circuits according to the first to third embodiments may be applied as imaging devices of digital cameras and video cameras.

<5. Fourth Embodiment>

Figure 13:
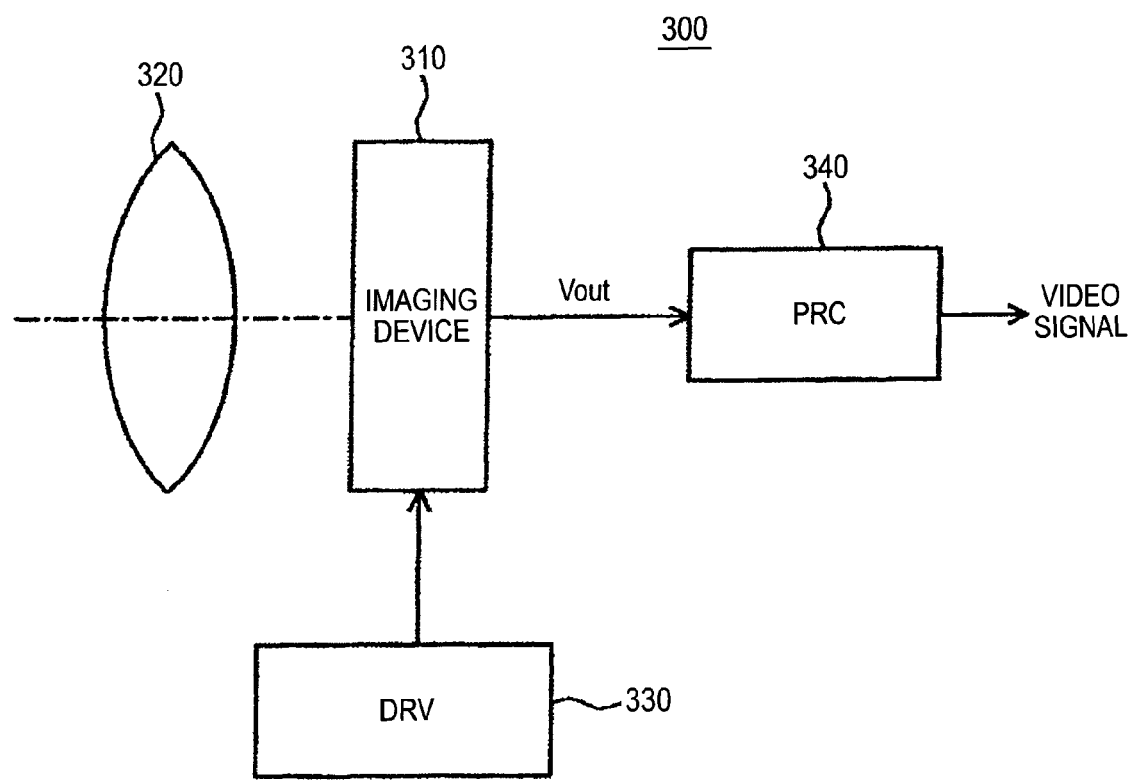
FIG. 13 is a diagram illustrating an exemplary configuration of a camera system to which the solid-state imaging device according to the embodiments of the invention is applied.

FIG. 13 is a diagram illustrating an exemplary configuration of a camera system to which the solid-state imaging device according to the embodiments of the invention is applied.

A camera system 300 includes, as shown in FIG. 13, an imaging device 310 to which the CMOS image sensor (the solid-state imaging device) 100 according to the embodiment can be applied.

The camera system 300 further includes an optical system that directs incident light to a pixel region of the imaging device 310 (that forms a subject image), such as a lens 320 that forms an image of the incident light (the image light) on an image capturing surface.

The camera system 300 also includes a drive circuit (DRV) 330 that drives the imaging device 310, and a signal processing circuit (PRC) 340 that processes an output signal of the imaging device 310.

The drive circuit 330 includes a timing generator (not shown in the drawings) that generates various timing signals including a clock pulse and a start pulse for driving circuits in the imaging device 310. The drive circuit 330 drives the imaging device 310 by using a prescribed timing signal.

Further, the signal processing circuit 340 applies prescribed signal processing to the output signal of the imaging device 310.

An image signal processed by the signal processing circuit 340 is recorded on a recording medium such as a memory. A hard copy of the image information recorded on the recording medium is generated using a printer or the like. Further, the image signal processed by the signal processing circuit 340 is displayed as a moving image on a monitor formed by a liquid crystal display or the like.

As described above, in an imaging apparatus such as a digital still camera, a low-power consumption and highly precise camera can be realized by including the above-mentioned imaging device 100 as the imaging device 310.

The present application contains subject matter related to that disclosed in Japanese Priority Patent Application JP 2010-077929 filed in the Japan Patent Office on Mar. 30, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
   a pixel circuit including a photoelectric conversion device and an amp device that outputs electric charges, which are photoelectrically converted by the photoelectric conversion device, through electric potential modulation of an output signal line; and
   a reading section including an AD (analog digital) conversion circuit that compares an output level of the signal line with a reference signal which changes with a regular slope and digitalizes an output signal on the basis of a timing at which a previously-defined relationship is satisfied between the output signal and the reference signal,
   wherein the reading section has
      a function of respectively performing first AD conversion, which is based on a first slope, and second AD conversion, which is based on a second slope, as AD conversion of imaging signals of pixels, and
      a function of further performing third AD conversion, which is based on the first slope, and fourth AD conversion, which is based on the second slope, as AD conversion of zero signals, and
   wherein the reading section selects, for each pixel, any one of pieces of digital data, which is obtained by subtracting a result of the third AD conversion from a result of the first AD conversion, and digital data, which is obtained by subtracting a result of the fourth AD conversion from a result of the second AD conversion, and generates imaging data on the basis of the selected digital data.

2. The solid-state imaging device according to claim 1,
   wherein a plurality of pixel circuits are arranged in a matrix, and
   wherein the reading section,
      at the time of reading the output signals from the pixel circuit for each row,
      performs the third AD conversion on the zero signals in accordance with the first slope which is gentle,
      inputs the imaging signals from the pixel circuit to the AD conversion circuit,
      performs the first AD conversion on the imaging signals in accordance with the first slope so as to acquire first digital data which is a difference between the result of the first AD conversion and the result of the third AD conversion, performs the second AD conversion on the imaging signals in accordance with the second slope which is steep, performs the fourth AD conversion on the zero signals in accordance with the second slope so as to acquire second digital data which is a difference between the result of the second AD conversion and the result of the fourth AD conversion, and selects any one of the first digital data and the second digital data for each pixel, and generates the imaging data of each row on the basis of the selected digital data.

3. The solid-state imaging device according to claim 1, wherein the reading section includes an output calculation circuit, and wherein the reading section selects the first digital data for the pixels of which values are specified by the first AD conversion and the second digital data for the pixels of which values are unspecified, horizontally transfers a group of the digital data selected from each pixel column to the output calculation circuit, and outputs the group of the digital data as the imaging data by applying calculation processing thereto as necessary.

4. The solid-state imaging device according to claim I, wherein a plurality of pixel circuits are arranged in a matrix, wherein the reading section includes a first line memory and a second line memory, and wherein the reading section, at the time of reading the output signals from the pixel circuit for each frame unit, performs the third AD conversion on the zero signals in accordance with the first slope which is gentle, performs the fourth AD conversion on the zero signals in accordance with the second slope which is steep, and stores the respective results thereof in the first line memory and the second line memory, at least before reading valid pixels, performs the first AD conversion on the imaging signals for each row in accordance with the first slope, and performs the second AD conversion in accordance with the second slope, in the reading of the valid pixels, and selects any one of the first digital data, which is obtained by subtracting the result of the third AD conversion from the result of the first AD conversion, and the second digital data, which is obtained by subtracting the result of the fourth AD conversion from the result of the second AD conversion, for each pixel, and generates output data of each row on the basis of the selected digital data.

5. The solid-state imaging device according to claim 4, wherein the reading section selects the first digital data for the pixels of which values are specified by the first AD conversion and the second digital data for the pixels of which values are unspecified, and outputs the group of the digital data as the imaging data by applying calculation processing thereto as necessary.

6. The solid-state imaging device according to claim 4, wherein the reading section includes an output calculation circuit, wherein the reading section selects the first digital data for the pixels of which values are specified by the first AD conversion and the second digital data for the pixels of which values are unspecified, and horizontally transfers a group of the digital data selected from each pixel column to the output calculation circuit, and wherein the output calculation circuit subtracts the result of the third AD conversion from the result of the first AD conversion for the same column and the result of the fourth AD conversion from the second AD conversion for the same column, and outputs the group of the digital data as the imaging data by applying calculation processing thereto as necessary.

7. The solid-state imaging device according to claim 1, further comprising:

a plurality of dummy pixels that are disposed on the respective columns and form source followers so as to be able to output the zero signals; and an equalizing circuit that equalizes random noise, which is caused by the source followers of the dummy pixels, by shorting the respective output signal lines at the time of acquiring the zero signals.

8. A camera system comprising:

a solid-state imaging device;

an optical system that forms an image of a subject on the solid-state imaging device; and a signal processing circuit that processes an output image signal of the solid-state imaging device, wherein the solid-state imaging device has a pixel circuit including a photoelectric conversion device and an amp device that outputs electric charges, which are photoelectrically converted by the photoelectric conversion device, through electric potential modulation of an output signal line, and a reading section including an AD (analog digital) conversion circuit that compares an output level of the signal line with a reference signal which changes with a regular slope and digitalizes an output signal on the basis of a timing at which a previously-defined relationship is satisfied between the output signal and the reference signal, wherein the reading section has a function of respectively performing first AD conversion, which is based on a first slope, and second AD conversion, which is based on a second slope, as AD conversion of imaging signals of pixels, and a function of further performing third AD conversion, which is based on the first slope, and fourth AD conversion, which is based on the second slope, as AD conversion of zero signals, and wherein the reading section selects, for each pixel, any one of pieces of digital data, which is obtained by subtracting a result of the third AD conversion from a result of the first AD conversion, and digital data, which is obtained by subtracting a result of the fourth AD conversion from a result of the second AD conversion, and generates imaging data on the basis of the selected digital data.

* * * * *